Sept. 10, 1963　　　K. HEINECKE ET AL　　　3,103,651
APPARATUS FOR INDICATING THE NUMERICAL MEASURED
VALUES OF UNNUMBERED SCALES
Filed May 23, 1960　　　　　　　　　　　　10 Sheets-Sheet 1

INVENTORS
KLAUS HEINECKE
WERNER HOLLE
By　WERNER WIESE
Toulmin & Toulmin
Attorneys

Sept. 10, 1963     K. HEINECKE ET AL     3,103,651
APPARATUS FOR INDICATING THE NUMERICAL MEASURED
VALUES OF UNNUMBERED SCALES
Filed May 23, 1960     10 Sheets-Sheet 8

Fig. 10

INVENTORS
KLAUS HEINECKE
WERNER HOLLE
WERNER WIESE
By Toulmin & Toulmin
Attorneys

United States Patent Office 3,103,651
Patented Sept. 10, 1963

3,103,651
APPARATUS FOR INDICATING THE NUMERICAL MEASURED VALUES OF UNNUMBERED SCALES
Klaus Heinecke and Werner Holle, both of Wetzlar (Lahn), and Werner Wiese, Konstanz-Wollmatingen, Germany, assignors to Ernst Leitz G.m.b.H., Wetzlar (Lahn), Germany
Filed May 23, 1960, Ser. No. 31,195
Claims priority, application Germany May 23, 1959
10 Claims. (Cl. 340—203)

The present invention relates to measuring equipment and more in particular to an apparatus for indicating the numerical measured values of unnumbered scales.

It is known in the art to provide apparatus of the type referred to having a scanning system operating on a two phase basic-producing two, preferably phase shifted signals and having fine adjusting means for the fine adjustment within the range of one scale interval.

In the known apparatus a frame is scanned which must be sufficiently fine that one frame bridge element is evaluated as one length quantum. Each length quantum supplies at least one pulse, and the pulses thus produced are fed to a counter. The frame must be extremely finely divided, e.g. by units $2n$ if correct measurements down to $1n$ are desired. Such frames are difficult to produce and extremely expensive.

It has also already been proposed to provide apparatus using comparatively coarsely divided frames and to obtain intermediate values by interpolation. The interpolation can be effected, e.g., by supplying the two phases to the two pairs of effecting plates of an oscillograph, thereby causing the light point on the screen to describe a closed curve. Each full revolution of the light point on the screen, indicated by one switch step of the counter, corresponds to one coarse interval, and each intermediate position corresponds to a value of interpolation. This arrangement calls for a comparatively accurate, although rather coarse, frame, preferably a sine frame.

For many purposes it is of advantage to effect the coarse reading by means of a counter connected with a scanning system, while the fine reading is done by a divided scale. It is very desirable to provide frames whose bridge elements can be positioned with comparatively great tolerance. A further advantage will be obtained if the numbered scale is replaced by an unnumbered scale and to have the measured value indicated as a numerical value. Furthermore, it will be of advantage to use one and the same device with only slight modifications both for close and remote reading.

These advantages are fully obtained by the apparatus of the present invention, according to which a scanning system is series-connected with a step-by-step motor driving a counter, and comprising a correction unit assuring that the correct measured value is indicated.

The correction can be effected by the direct influence of the motor, or by means of a differential provided between the motor and the counter, or by means of diaphragm means.

The apparatus of the invention can be based, as to its structure and operation, on the balancing measuring system or on the stroboscopic measuring principle, the latter being particularly adapted for moving scales and continuous readings.

The invention will be explained in greater detail with reference to the drawings wherein.

Referring now to a first embodiment of the invention, illustrated in FIGURES 1 to 4, FIGURE 1 shows a scale 1 with division strokes 2 and a frame 3, illuminated by a light source 4 through a lens 5 and a partially transparent deflecting prism 6. An image of frame 3 is produced by lens 7 in image plane 8. In the image plane two photoelectric receivers 9 and 10 are disposed at a distance $\lambda/4$ from one another, with $\lambda$ representing the frame length of the image 11 of frame 3 as produced by lens 7 in image plane 8. The photoelectric receivers 9 and 10 are connected with a control unit 12 which controls a step-by-step motor 13 and a relay 14. The motor 13 is drivingly connected with a transmission consisting of gears 15 and 16, and with a differential consisting of bevel gears 17, 18, 19 as well as a bearing bracket 20, and thereby impels a counter 21. The counter 21 consists of a number of rolls, e.g. three rolls a unit roll 22, a ten roll 23, and a hundred roll 24, as well as a mark 25 indicating, by its position, the respective numerals representing the measured value.

Figure 1:
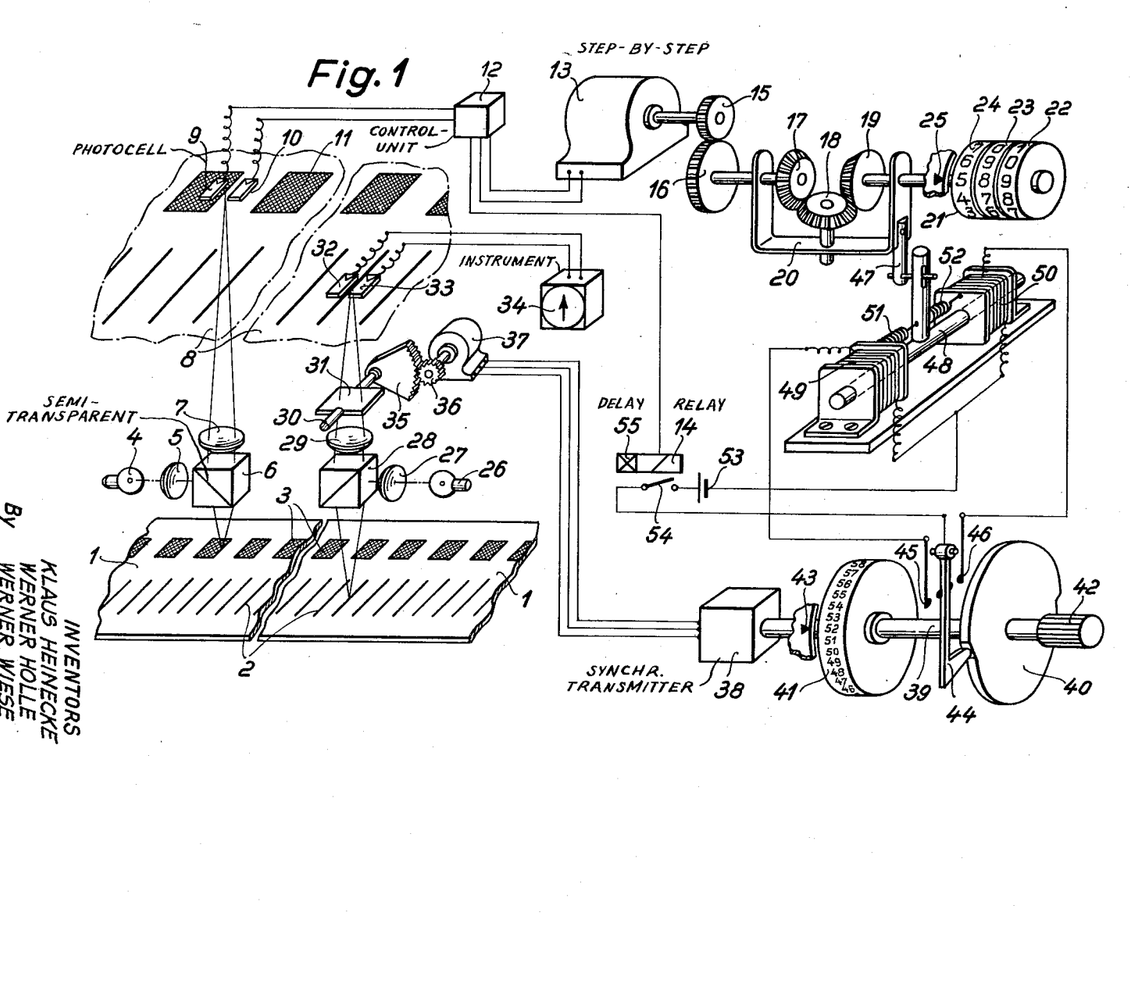
FIGURE 1 is a perspective and partly schematic view of a basic embodiment of the apparatus of the invention with fine reading means operating according to the balancing principle of measurement and having correction means comprising a differential controlled by curved disk means.

The division strokes 2 are illuminated by a light source 26 through a lens 27 and a semi-specular deflecting prism 28. An image of the division strokes is produced in image plane 8 by lens 29 through a plane-parallel plate 31, pivotable about shaft 30. A pair of photoelectric receivers is disposed in the image range of division strokes 2 in image plane 8 and forms an electric capture fork element. A balancing instrument 34 contains a differential circuit or the like and enables the symmetrical capture of the imaged division strokes.

The plane-parallel plate 31 is connected with a transmission consisting of a gear sector 35 and a gear 36 and, hence, with a rotary field receiver 37 driven by a synchronous transmitter 38. The latter is mounted on a shaft 39, also supporting a curved disk 40, a drum 41 provided with numerals from "1" to "100," and a knurl ring 42. A reference mark 43 indicates the number to be read from drum 41 representing the measured value. Curved disk 40 controls a contact spring 44 cooperating with contacts 45 and 46.

At the bearing bracket 20 of the differential there is affixed a bridge element 47 connected with a T-shaped core element 48 adapted to plunge into magnetic coils 49 and 50. The T-shaped core 48 is connected with the magnetic coils 49 and 50 by means of springs 51 and 52. The windings of coils 49 and 50 are connected with contacts 45 and 46, respectively, with the respective other ends of the windings being connected with a current source 53. The latter is connected with contact spring 44 via a switch 54 operated by relay 14. The relay has a retarding element 55 and is thus of the slow-operating type.

Figure 2:
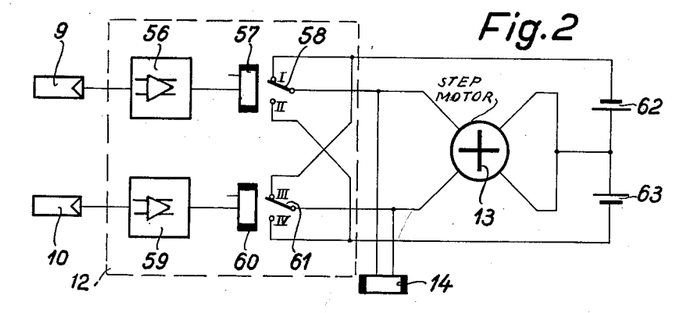
FIGURE 2 is a wiring diagram of the electro-mechanical switch means for actuating the motor in FIGURE 1.

The control unit 12 is shown in greater detail in FIGURE 2. It consists of a first photoelectric receiver 9, series-connected with an amplifier 56 and a relay 57, the latter operating a contact 58 alternating between two positions indicated by I and II. A second photoelectric receiver 10 is series-connected, in an entirely analogous manner, with an amplifier 59 and a relay 60; the latter operates contact 61 alternating between positions I and II. Current is supplied by two current sources 62 and 63. Furthermore, there is provided a step-by-step motor 13, which is of the type of two-phase-synchronous motors with a magnet rotor, i.e. having a total of four poles.

The afore-described embodiment operates as follows:

The photoelectric receivers 9 and 10 scan the frame 3. With reference to the receivers 9 and 10 the imaged points have a phase difference of one half field width of the frame elements or the interspaces between the latter, resulting, counting the entire frame period, in a phantom cycle. If, for example, the two photoelectric receivers 9 and 10 are located in a light field, photoelectric voltages are obtained which are amplified by the amplifiers 56 and 59 and actuate relays 57 and 60. The relay contacts 58 and 61 are moved into positions I and III, respectively, and invert the direct currents in the windings of motor 13. If, for example, the photoelectric receiver 9 moves into a dark field, the photoelectric voltage at receiver 9 disappears, relay contact drops into position II and reverses the polarity of one of the windings of motor 13. The resultant of the magnetic field in the magnet rotor is shifted by 90°.

The foregoing operation thus results in a step-by-step drive of motor 13, impelling, step-by-step, unit roll 22 of counter 21. Since for the shift of each numeral on unit roll 22 two steps should be required, and as the unit roll has ten numerals, the roll has performed a full revolution after 20 steps. In case of a four-pole motor the transmission ratio should thus be 1:5.

The division strokes 2 are captured by means of the photoelectric receivers 32 and 33 and the balancing instrument 34 after pivoting the plane-parallel plate 31, which latter is pivoted by turning ring 42, via the mechanical shaft 39 and the electric transmitter elements 37 and 38.

The division strokes 2 and the counter are so adjusted that, for a determined range of numbers, the units on unit roll 22 are in an unequivocal position with respect to the tens and hundreds on rolls 23 and 24, so as to form one row composed of three numerals, a hundred, a ten, and a unit, thus clearly indicating a specific numerical value. This position is obtained whenever the drum 41 indicates a number in the range from about "25" to "75." If, however, a number between "0" and "25," and "75" and "100" is to be indicated, two units of roll 22 appear equivocally next to the respective ten on roll 23. This makes it necessary to provide for correction means deciding which one of the two unit numerals is the correct one. This is effected by the cooperation of a number of elements of the above-described structure as follows: Relay 14 is excited if the two windings of motor 13 are excited counter-currently and a voltage is produced between relay contacts 58 and 61 (FIGURE 2). Counter-current excitation of the windings of motor 13 and the equivocal appearance of two numerals on unit roll 22 thus occur at the same time. In this case relay 14 attracts relay contact 54 and causes the excitation of coils 49 and 50. The respective position of curved disk 40 determines which one of the coils 49 and 50 will be excited: If, e.g., contact spring 44 is in connection with contact 45, coil 49 will be excited, whereas coil 50 will be excited if curved disk 40, as operated by turning knurl knob 42, moves contact spring 44 against contact 45. In the first-mentioned position, i.e. with contact spring 44 in contact with contact 45, the excited coil 49 attracts core 48, taking along bridge element 47, bearing bracket 20 and bevel gear 18 of the differential. As only bevel gear 17 is blocked by motor 13, the pivoting movement of bracket 20 and gear 18 turns bevel gear 19 by a determined amount and in the desired direction so that the correct numeral of unit roll 22 is moved into aligned position with mark 25 and a ten and hundred numeral. The retarding unit 55 causes relay 14 to operate slowly in order to prevent bracket 20 from oscillating.

Figure 3:
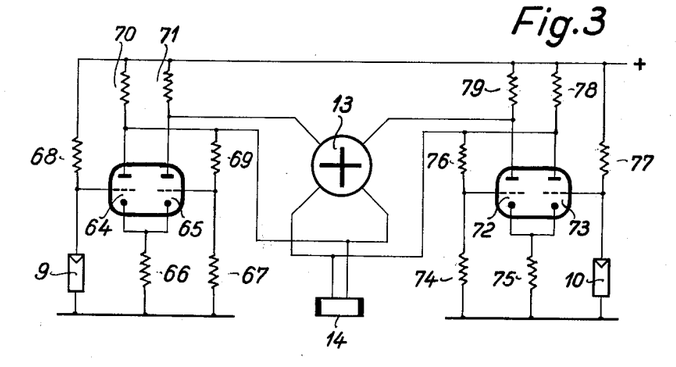
FIGURE 3 is a wiring diagram of electronic switch means for actuating the motor in FIGURE 1.

The afore-described embodiment of the apparatus of the invention can also be operated with electronic switches as shown, for example, in FIGURE 3, wherein the relays 57, 60 of FIGURE 2 have been replaced by electronic switches, e.g. Schmitt-triggers. The first trigger contains two triodes 64, 65, resistances 66, 67, 68, 69, 70, 71, and the photoelectric receiver 9. The second trigger contains triodes 72, 73, resistances 74, 75, 76, 77, 78, 79, and the photoelectric receiver 10. The two triggers control motor 13 and relay 14, as described with respect to the wiring arrangement of FIGURE 2.

Figure 4:
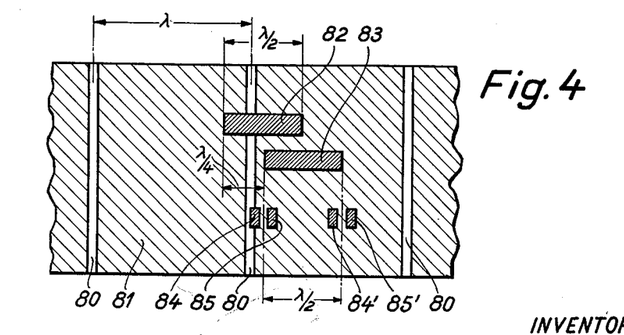
FIGURE 4 is a schematic view of the arrangement of photoelectric receivers in the image plane of the scanning system in FIGURE 1.

The photoelectric receivers can also be disposed in the image plane in an arrangement as shown in FIGURE 4. The photoelectric receivers 82, 83, corresponding to the receivers 9 and 10 in FIGURE 1, have a longitudinal extension equal to one half of the frame constant of the frame image, i.e. λ/2 and disposed in staggered relationship by λ/4. The photoelectric receivers 84, 85 and 84′, 85′ correspond to the photoelectric receivers 32 and 33 and form a capture system. Scale 1 of FIGURE 1 can thus be replaced by the scale arrangement of FIGURE 4, provided the receivers 9 and 10 are replaced by receivers 82 and 83 and receivers 32, 33, by receivers 84, 85 and 84′ and 85′.

Figures 5, 6:
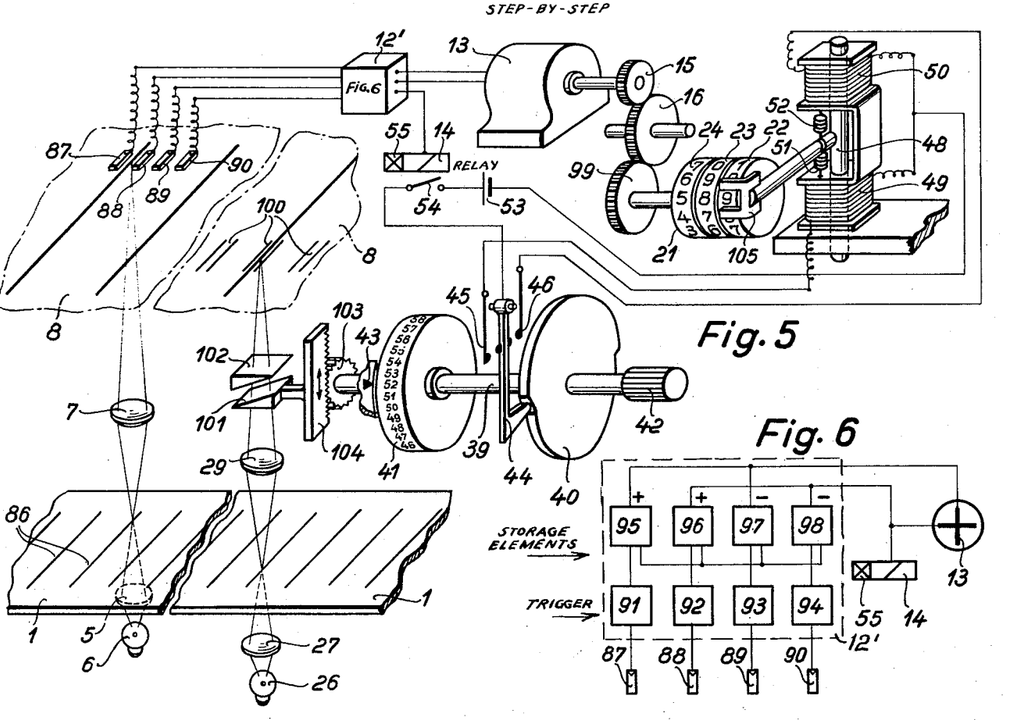
FIGURE 5 is a perspective and partly schematic view of another embodiment of the invention for close reading and diaphragm means in the correction unit.
FIGURE 6 is a wiring diagram of a scanning system operating according to the two phase principle and having four photoelectric receivers.

Another embodiment of the invention is shown in FIGURE 5 wherein, as well as in the following embodiments, like reference numerals indicate the same parts, there is provided a scale 1 having dark division strokes 86 and a transparent body, whereof an image is formed in image plane 8 by a lens 7. In the image plane 8 there are provided photoelectric receivers 87, 88, 89, 90 which are series-connected with a control unit 12′. This unit is shown in greater detail in FIGURE 6. It comprises the triggers 91, 92, 93, 94 and storages 95, 96, 97, 98. The storages 95 and 97 are connected with one of the windings of step-by-step motor 13, whereas storages 96 and 98 are connected with the other windings of motor 13. This other winding is also connected with the relay 14 having a retarding element 55.

If a division stroke passes, for example, the photoelectric receiver 87, a negative pulse is produced, actuating trigger 91, which latter supplies a positive voltage to the first winding of motor 13 via storage 95. Simultaneously all other triggers are blocked. If now a negative pulse is produced at photoelectric receiver 88, trigger 92 is operated and a positive pulse is supplied via storage 96 to the other winding of motor 13, simultaneously blocking all other storages, including storage 95. Motor 13 now turns by one step and drives counter 21 via the bevel gears 15, 16 and 99.

The image of one division stroke 86 is captured by reading graticule 100 in the following manner: Wedge element 101 is displaced relative to stationary wedge element 102 by turning knurl knob 42 via shaft 39, gear 103, mounted on the latter, and rack 104 connected with wedge element 101 and meshing with gear 103.

Storages 96 or 98 furnish a voltage until two numbers appear equivocally on the unit roll 22 of counter 21. Relay 14 closes relay contact 54. According to whether mark 43 points to one of the numerals between "0" and "25" or "75" to "100" after bringing one of the two equivocal numbers in alignment with the mark, either contact 45 or 46 come in contact with contact spring 44, thereby exciting either coil 49 or coil 50. Correspondingly, the fork 105, connected with the T-shaped core 48, is displaced and indicates the correct numeral.

Figure 7:
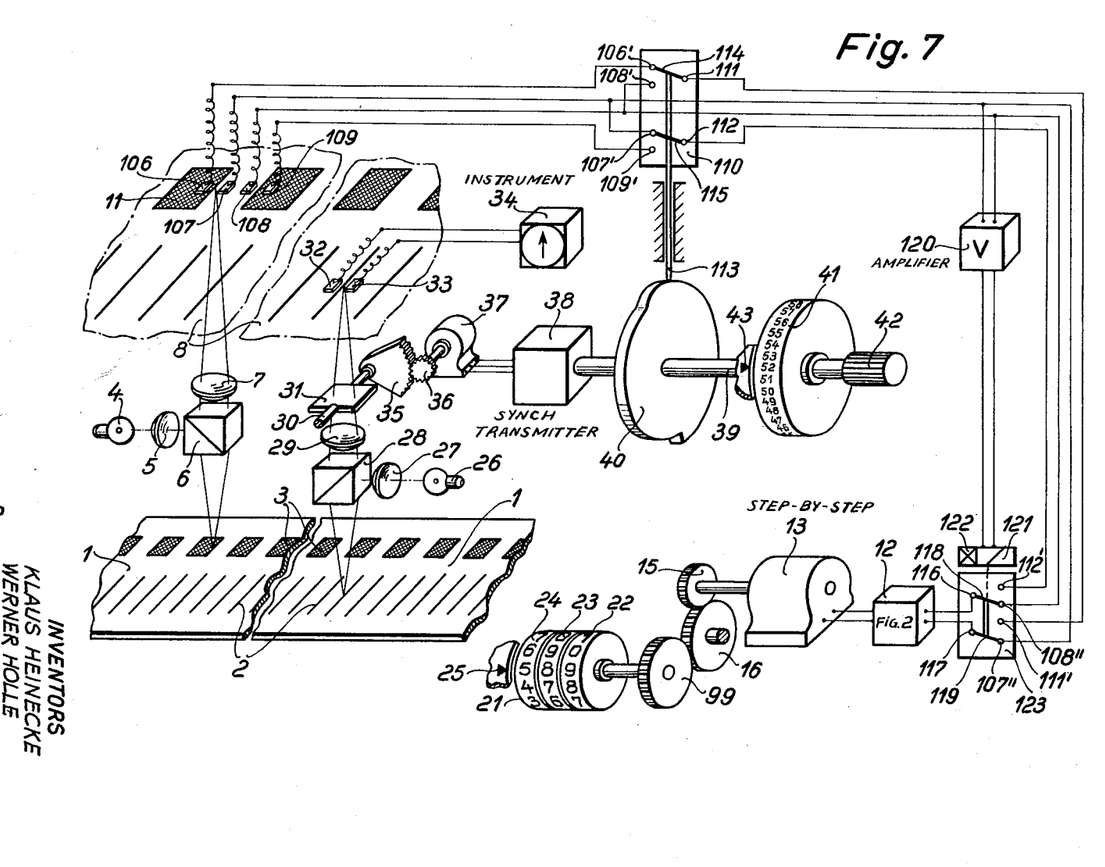
FIGURE 7 is a perspective and partly schematic view of an embodiment of the invention wherein the position of the roll with numerals is corrected directly by the motor.

A further embodiment of the invention is shown in FIGURE 7 wherein the correction operation in case of the equivocal appearance of two unit numerals is effected directly by the motor and two double switches.

Scale 1 is provided with division stroke 2 and a frame 3, illuminated by light source 4, lens 5 and partially transparent semi-specular deflecting prism 6. Lens 7 forms an image of frame 3 in the image plane 8 in which latter there are disposed four photoelectric receivers 106, 107, 108, 109, equidistantly spaced by λ/4. Correspondingly, λ is the frame period of the image 11 of frame 3. The photoelectric receivers are series-connected with contacts 106', 107', 108', 109' of double switch 110. The further contacts 111, 112 of the double switch as well as contacts 107', 108' are connected with the contacts 107'', 108'', 111', 112' of a second double switch 123. The further contacts 116, 117 of switch 123 are connected with control unit 12, controlling motor 13, which latter drives, via gears 15, 16, 19, the counter 21 consisting of hundred roll 24, ten roll 23, unit roll 22 and mark 25.

The division strokes 2 are illuminated by light source 26, lens 27, and semi-specular deflecting prism 28. Lens 29 forms an image of division strokes 2 in image plane 8 through plane-parallel plate 31, pivotable about shaft 30. Within the image range of division strokes 2 there are disposed two photoelectric receivers 32 and 33 forming an electric capture system. Balancing instruments 34 enables a symmetric capture of the respective images of the division stroke. The plane-parallel plate 31 is connected with a receiver 34 via a transmission consisting of gear sector 35 and gear 36, the receiver 37 being controlled by transmitter 38. The latter is mounted on shaft 39 which shaft also supports curved disk 40 and drum 41 bearing numerals from "1" to "100," as well as a knurl knob 42. The measured value is indicated by mark 43. Curved disk 40 controls a scanning bolt 113 connected with switch levers 114 and 115 of double switch 110. The photoelectric receivers 107 and 108 are connected with an amplifying system 120 controlling the slow-operating relay 121, the retarding unit being designated with 122. Due to the slow operation of relay 121 the same remains in its resting position whenever the scale is moved quickly. This will result in two pulses being supplied simultaneously or substantially simultaneously to motor 13 which would lead to equivocal erroneous indications. Relay 121 controls switch levers 118 and 119 of double switch 123. The arrangement is so chosen that the numerals of unit roll 22 are in perfect alignment with the specific numerals of rolls 23 and 24, whenever the two photoelectric receivers 107 and 108 receive light and whenever the correct number to be indicated is between "25" and "27." The motor 23 cannot be advanced or stepped back in case of simultaneous illumination of receivers 107 and 108, as relay 121 does not respond and the switch levers 118 and 119 maintain contact connections 108'', 116 and 107'', 117. However, if receivers 106 and 107 or 108 and 109 are illuminated, the correct number is somewhere between "0" and "25" or "75" and "100." Two numerals appear on roll 22 equivocally and the correction is effected by means of switches 110, 123 and relay 121 in the following manner: It is assumed that after capturing a division stroke 2 by capture system 32, 33 the measured value is between the range of "75" and "100." In that case contacts 106', 111 and 107', 112 are connected. By exciting relay 121 contacts 111', 117 and 112', 116 are connected and motor 13 is connected with the illuminated photoelectric receivers 106 and 107 via control unit 12. The unit roll 22 is then moved backwardly to have only one and the correct numeral in alignment with a ten and a hundred numeral.

If, on the other hand, the measured value is between the range "0" to "25," contacts 108', 111 and 109', 112 are connected and relay 121 connects contacts 111', 117 and 112', 116. Motor 13 is now connected with the photoelectric receivers 108 and 109 which are not illuminated and the unit roll is advanced rather than returned so as to move the correct numeral in alignment.

A further embodiment of the invention is based on the stroboscopic measuring principle. According to the application of this principle the measuring scale is scanned continuously by a light mark of the type of a relaxation oscillation, wherein the sweep amplitude is equal to one interval unit on the measuring scale, or to an even numbered multiple thereof. The indicating unit consists of an interpolation scale which is moved with the scanning division stroke synchronously and in locked phase relation. The portion of the scale close to a fixed reading pointer is illuminated by a flash lamp at the moment in which the scanning division stroke scans a division stroke on the scale. The scanning unit preferably comprises a rotary disk having a spiral-shaped opening; associated with the scanning unit there is provided an indicating unit consisting of a circular scale synchronously and in locked phase relation with respect to the scanning disk.

Since the initial and final values of the scale coincide an equivocal indication is obtained even if the aforedescribed correction unit is provided.

According to the invention such equivocal indications are eliminated by providing a double scale at least for the area in the vicinity of the initial value "00" coinciding with the final value "1.00," and by further providing means for removing one of the two scales, which means are coupled with the correction unit.

The sign of correction is determined by a switch operated by the disk of the indicating unit. Preferably a photoelectric or magnetic switch is used.

The two phases for driving the motor can be produced by a light-and-dark frame. It is, however, also possible to derive them from the phase position between the stroboscope pulses and the scanning phases, e.g. by phase-sensitive rectifiers, synchronous switches or equivalent electrical, photoelectrical, magnetic or mechanical means, provided the scanning frequency is sufficiently elevated with respect to the movement of the scale.

It is also possible to provide scales wherein the division strokes are spaced by a multiple of the length unit represented by the numerals of the coarse counter.

Furthermore, scanning units can be used which are connected with balancing means, consisting, e.g. of a pivotable plane parallel plate. The plate can be pivoted electrically by means of a synchronous transmitter and receiver and can be controlled from the point of indication, in which case the counter is provided with mechanical zero adjusting means.

Figure 8:
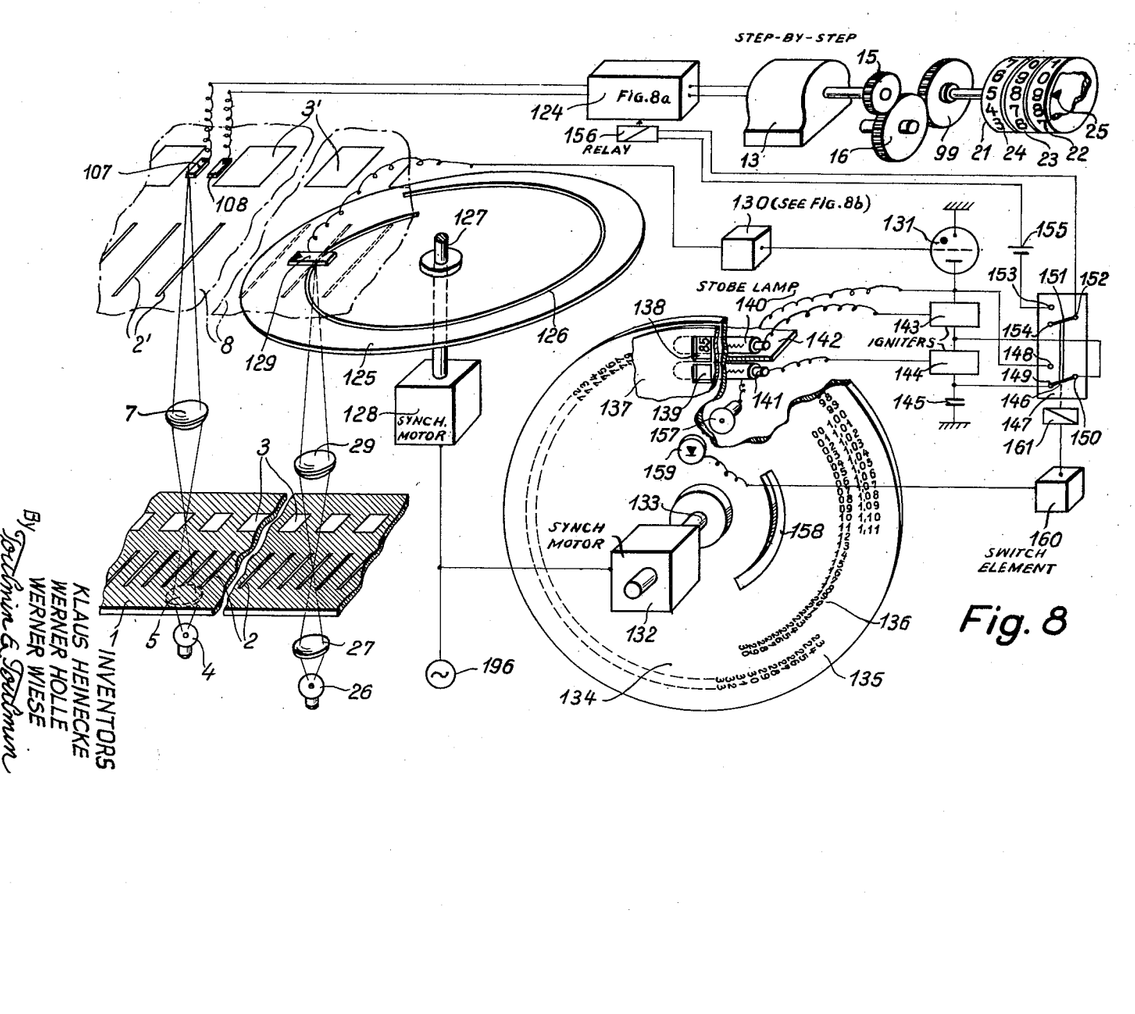
FIGURE 8 is a perspective and partly schematic view of an embodiment of the invention equipped with structure for the stroboscopic system of measurement.

The above general remarks will next be further explained in greater detail, first with reference to FIGURE 8, wherein the scale 1 is shown as having division strokes 2 and a frame 3 illuminated by a light source 4 through lens 5. An image 3' of frame 3 is produced by lens 7 in image plane 8, in which latter are arranged two photoelectric receivers 107 and 108 at a mutual distance of λ/4, λ being the frame period of the image 3' of frame 3.

Figure 8A:
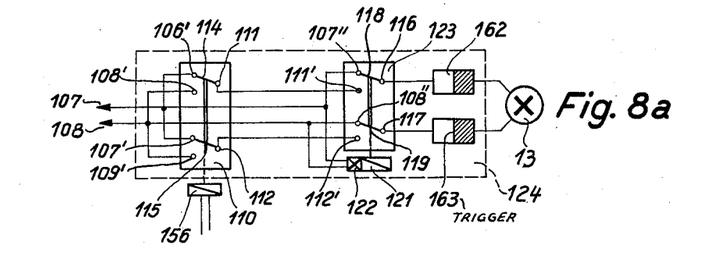
FIGURES 8a and 8b are wiring diagrams of particular switch elements used in the embodiment of the apparatus shown in FIGURE 8.

The wiring connections of the photoelectric receivers 107, 108 lead to a switch element 124 which is shown in greater detail in FIGURE 8a. It contains a double switch 110, the contacts 106', 107' and 108', 109' of which are connected with the photoelectric receivers 107 and 108, and the further contacts 111 and 112 of which are connected with the contacts 111', 112' of a second double switch 123. The contacts 107'', 108'' of the latter are connected with the photoelectric receivers 107 and 108. The further contacts 116, 117 of the second double switch 123 are connected with Schmitt-triggers 162 and 163, controlling the step-by-step motor 13. Motor 13 drives a counter consisting of numeral rolls 22, 23, 24 and a mark 25 via gears 15, 16 and 99.

Figure 8B:
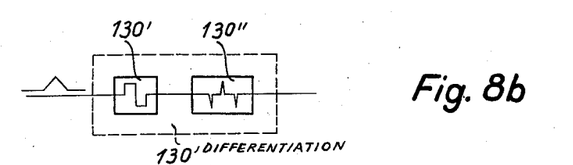

The division strokes 2 are illuminated by a light source 26 through lens 27 and are imaged by lens 27 in the image plane 8 as indicated by numeral 2'. In the image plane 8 there is disposed a disk 125 having a spiral-shaped opening 126 the pitch of which corresponds to the interval of two division strokes in image plane 8. Disk 125 is mounted on a shaft 127 and is driven by a synchronous motor 128 supplied with current from an alternating current mains 196. A photoelectric receiver 129 is disposed above the spiral-shaped opening 126 and is connected with a switch element 130 (see FIGURE 8b) and a thyratron 131.

A further synchronous motor 132, also supplied by alternating current mains 196, drives an indicating disk 134 via shaft 133. Disk 134 has two circular, concentrically disposed arrangements of numerals 135 and 136. The first set of numerals 135 starts with the value 1.00 and leads up to the value 1.11, whereupon it is interrupted and starts again with numeral 23 up to numeral 99. Value 1.00 follows immediately upon value 99. Next to the value 1.00 up to 30 a second set of numerals 136 is arranged comprising the numerals from 00 up to 30. A diaphragm 137 having openings 138 and 139 is arranged in front of indicating disk 134 for showing the respective values selected from the sets of numerals 135 and 136. A first stroboscopic lamp 140 is provided behind indicating disk 134 above opening 138. A second stroboscopic lamp 141 is disposed above opening 139. A diaphragm 142 is positioned between both lamps. The lamps are controlled by igniters 143 and 144 which are connected with the anode of thyratron 131 and a capacitor 145 and can be alternatingly operated by the switch lever 146 of a double switch 147 and via contacts 148, 149 and 150. The second switch lever 151 has associated contacts 152, 153, 154 and is adapted to close the circuit containing a current source 155 and a relay 156, operating the double switch 110 (see FIGURE 8a).

A flash lamp 157 is mounted behind the indicating disk 134 and illuminates an ark-shaped opening 158 of disk 134. The opening extends approximately from numeral 00 up to numeral 27 and the corresponding positions of disk 134 allow the light rays from flash light 157 to pass on to photoelectric receiver 159. The signals emitted by the latter are transformed in a switch element 160 and then excite the relay 161, operating double switch 147.

The operation of the afore-described embodiment is as follows:

The two-phase signals needed for driving motor 13 are obtained by the photoelectric receivers 107 and 108 scanning the frame image 3'. Upon rotating disk 125 the spiral-shaped opening 126 runs in longitudinal direction over the image of scale in image plane 8. Since the width of the spiral-shaped opening 126 is exactly identical with the width of the images 2' of the division strokes 2 of scale 1, the opening 126 is in a position congruent with the division stroke image 2', once each full revolution. In the congruent position the photoelectric receiver 129 receives a light flash having a triangular intensity sequence and the peak of which represents the measured value. The intensity sequence of the light flash does not change if the spiral-shaped opening 126 merely edgewise comes to pass over part of a division stroke. In that instance the next-following division stroke supplies, in cooperation with the then fully congruently positioned peripheral end of the spiral, the triangularly shaped intensity sequence. If the scale is at rest, the flash is produced always at the same position of phase of synchronous motor 128, or at the identical angular position of disk 125, respectively. As soon as scale 1 moves, the phase position of the flash is displaced in direct proportion to the displacement of the scale, more specifically by 360° for each displacement of the scale by one interval. The pulses produced by photoelectric receiver 129 are amplified and converted into small trigger pulses by the members 130' and 130'' on unit 130 (see FIGURE 8a) and then ignite the stroboscopic lamps 140 and 141, respectively, via thyratron 131. The stroboscopic lamps illuminate the sets of numerals 135 and 136 of the indicating disk 134. Since both disks 125 and 134, driven by synchronous motors 128 and 132, revolve in locked phase relationship, the phase position of the igniting pulses can be read from disk 134 through opening 138, so as to ascertain the displacement of scale 1 by one-hundredths portions of the unit interval of the scale.

The choice between the values 0.00 and 1.00 is made automatically. Flash lamp 157 emits light flashes in regular intervals together with stroboscopic lamps 140 or 141 and thereby actuates relay 161 whenever light pulses are received through opening 158. The choice is made in the following manner: It is assumed that the actual measured value is 85, as shown in FIGURE 8. No light is received by photoelectric receiver 159 and relay 61 is in its resting position. Consequently, switch lever 146 connects contacts 149 and 150 and stroboscopic lamp 141 is short-circuited, whereas stroboscopic lamp 140 illuminates scale 135 and value 85 becomes visible. If scale 1 is further displaced, the values 86, 87, and finally value 1.00 appear in opening 138. This signifies that one unit must be added to the measured value indicated by counter 21. In case of a numerical value of 1.01 the photoelectric receiver 159 receives light through opening 158, excites relay 161, thereby actuating switch levers 146 and 151 of switch 147, so as to connect contacts 148 and 150, or 153 and 152, respectively. Consequently, lamp 140 is extinguished, whereas lamp 141 is ignited and the value 01 of the set of numerals 136 becomes visible. At the same time relay 156 actuates double switch 110, determining the sense of correction and advancing counter 121 by one unit. Stroboscopic lamp 141 remains in operation up to the value 30, corresponding to the end of opening 158, whereupon lamp 140 becomes operative.

Figures 9, 9A:
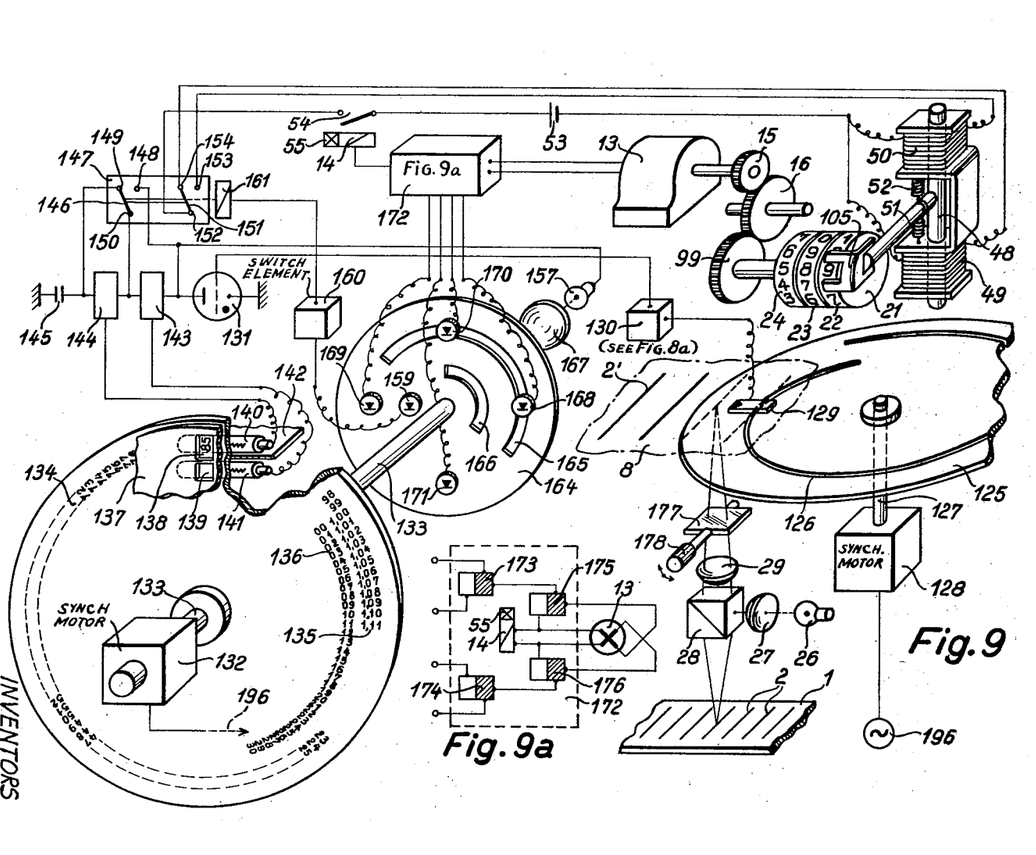
FIGURE 9 illustrates a modification of the embodiment of FIGURE 8.
FIGURE 9a is a wiring diagram of a particular switch element of FIGURE 9.

According to a further embodiment of the invention, shown in FIGURE 9, a disk 134 is provided without a recess. The disk is supported by shaft 133 which latter supports a further disk 164 with a semicircular slot 165 and a further opening 166, which latter corresponds to opening 158 of the embodiment of FIGURE 8, as to its form and angular position. In this embodiment stroboscopic lamp 157 illuminates disk 164 through a lens 167 from behind and emits light to the photoelectric receivers 168 and 169; 170 and 171, provided before slot 165 and spaced from one another by 90°. In addition, light rays are emitted to the photoelectric receiver 159 disposed before opening 166. A switch unit 172, shown in greater detail in FIGURE 9a, controls motor 13, and via a relay 14, the correction unit. Motor 13 drives counter 21 via gears 15, 16 and 99. The photoelectric receivers 168 and 169 actuate a bistable multivibrator 173 in such a manner that the pulses of photoelectric receiver 168 switch multivibrator 173 into one position, whereas pulses from receiver 169 switch the multivibrator in the other position. The photoelectric receivers 170 and 171 actuate multivibrator 174 correspondingly. If scale 1 is displaced, the voltage between multivibrators 173 and 174 forms a four-cycle rotary field. Since, however, four steps correspond to each unit interval on the scale, and since only two steps for each interval are desired, there are provided two Eccles-Jordan units 175 and 176 extending the four-cycle to two unit intervals. The relay 14 has a retarding member 55 and is connected with motor 13.

The correction unit consists of two magnetic coils 49 and 50 with a T-shaped core 48 adapted to plunge into the coils. Core 48 supports a fork-shaped member 105 and is connected with coils 49 and 50 by means of springs 51 and 52. The coils 49 and 50 are connected with one end to contacts 154 and 153, respectively, while the respective other ends are connected with a current source 53 which can be connected with contact 152 of switch 147 by means of switch 54, operated by relay 14.

The reading unit operates in an analogous manner to the reading unit of the embodiment of FIGURE 8 with the exception that the two-phase signals are differently obtained and the corrected value of the unit roll 22 of counter 21 is indicated by the fork-shaped member 105. Furthermore, a plane-parallel plate 177 is provided in the path of rays coming from scale 1. It can be pivoted by means of a knurl knob 178. The numeral 00 can be made to appear in opening 139 by turning this plate 177.

Figure 10:
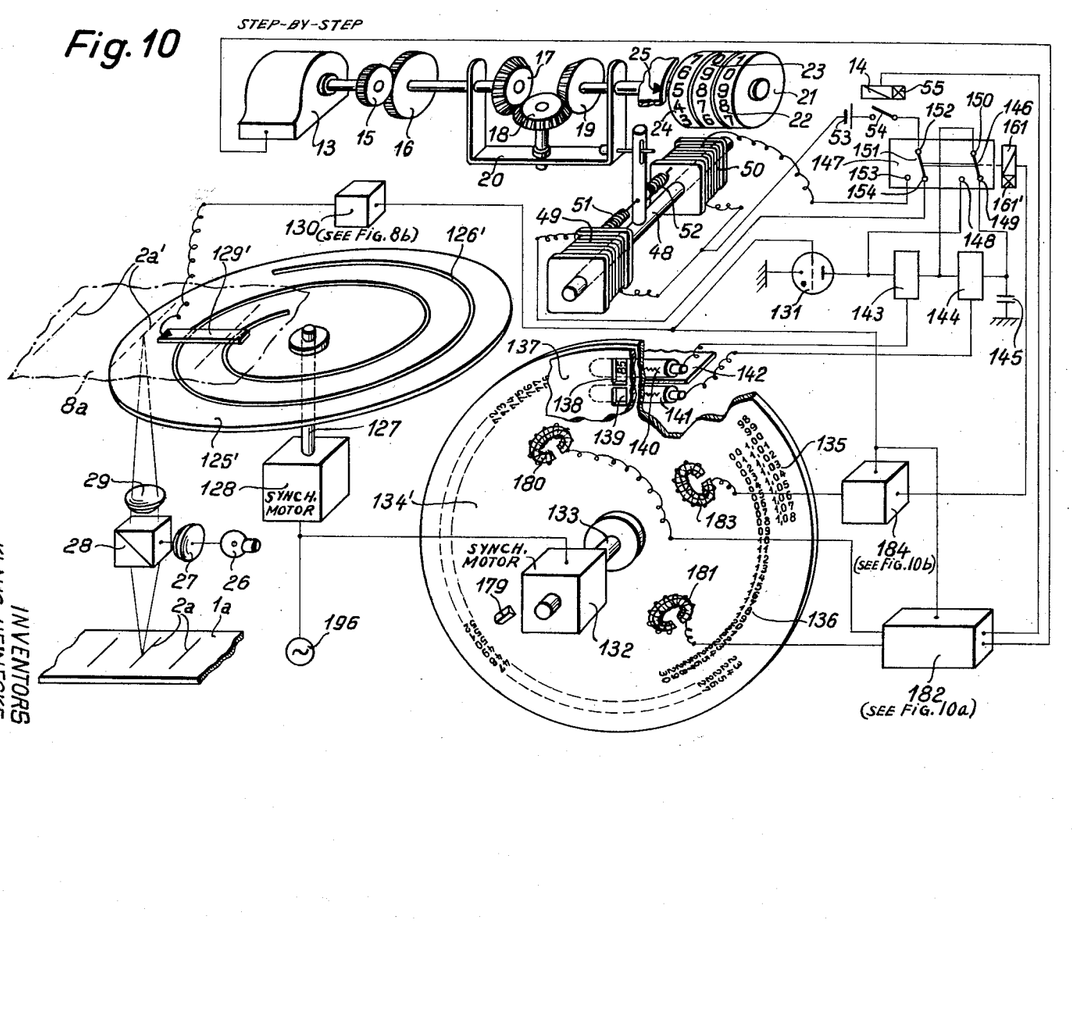
FIGURES 10 and 11 illustrate further modified apparatus operating according to the stroboscopic principle of measurement.

In the embodiment illustrated in FIGURE 10 a scale 1a is used wherein the division strokes 2a are spaced by twice the distance of the length unit numerals of coarse counter 21. The shaft 127 of synchronous motor 128 supports a disk 125' having a spiral-shaped opening 126' forming a double track and having a pitch equal to one half of the intervals of the images of division strokes in image plane 8. The spatial extension of the photoelectric receiver 129' associated with this disk is equal to the interval of the images 2a' of the division strokes. Due to the double track of spiral opening 126' the position of the light flashes relating to the face position of synchronous motor 128 or the angular position of disk 125' is repeated after the displacement of signal 1a by one-half of an interval. The pulses produced in this scanning unit ignite the stroboscopic lengths 140 and 141 in the afore-described manner.

An indicating disk 134' is mounted on shaft 133 of synchronous motor 132 and supports the indicating disk 134, the sets of numerals 135, 136 and a magnetic mark 179. The latter is scanned by magnetic heads 180 and 181 which are spaced from each other by 90°. The pulses produced by magnetic heads 180 and 181 are supplied to a switch unit 182 shown in greater detail in FIGURE 10a, controlling motor 13. The motor is connected, via gears 15 and 16, with a differential consisting of bevel gears 17, 18, 19 and a bracket 20 and thus drives counter 21. The magnetic mark 179 is also scanned by a further magnetic head 183 spaced from magnetic heads 180 and 181 by 90° and supplying pulses to a switch unit 184 actuating a relay 161.

Figure 10A:
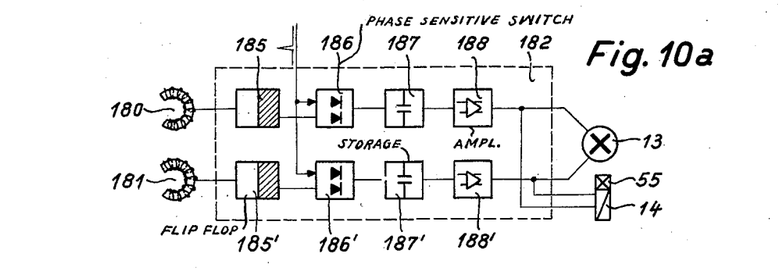
FIGURES 10a and 10b, and FIGURES 11a and 11b, are wiring diagrams of particular switch elements used in the embodiments of FIGURES 10 and 11, respectively.

As shown in FIGURE 10a the switch unit 182 contains two bistable multivibrators 185 and 185' actuated by the pulses supplied by magnetic heads 180 and 181 and producing rectangular voltages with a phase shift of 90° and a frequency equal to one-half the frequency of revolution of disk 134'. The rectangular voltages are supplied to phase-sensitive switches 186 and 186' which are controlled by the pulses of photoelectric receiver 129' and transmitting the actual value of the rectangular voltages to two storages 187 and 187'. The voltages leaving these storages form a two-phase-rotary field characterized by a four-cycle for each displacement of scale 1a by one interval of the division strokes. The storages 187 and 187' are series-connected with direct current amplifiers 188 and 188' and the currents obtained from the latter drive motor 13 and actuate the correction unit via relay 14.

Figure 10B:
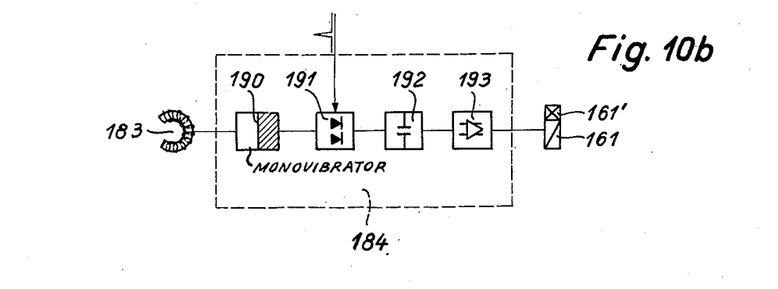

The switch unit 184 is shown in greater detail in FIGURE 10b wherein the monostable multivibrator 190 is so adapted as to return to one stationary condition after disk 134' has performed about one-third of a full revolution. The multivibrator 190 receives signals from magnetic head 183 and produces a rectangular voltage which is supplied to the phase-sensitive switch 191 which is also controlled by the pulses of photoelectric receiver 129'. The voltage is supplied to a storage 192, and the actual voltage stored therein controls the slow operating relay 161 (with a retarding element 161'), via a direct current amplifier 193.

The further structure and operation correspond to the embodiment of FIGURE 9. The embodiment of FIGURE 10 differs from that shown in FIGURE 9 by the means for obtaining and electrically storing the correction signals, and the two-phase signals for driving the motor 13.

Figure 11:
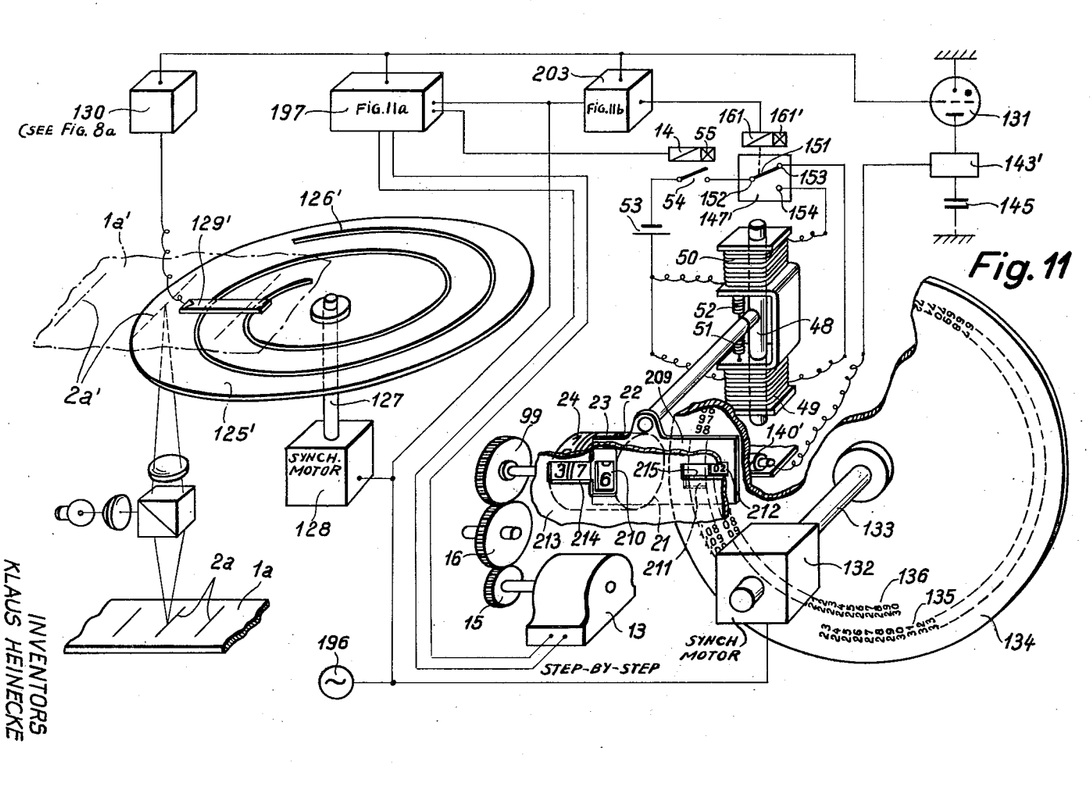

A further embodiment is shown in FIGURE 11, which differs from the embodiment shown in FIGURE 10 in that the correcting signals and the two-phase signals for driving the motor 13 are obtained from an alternating current mains 196, wherefrom power is obtained for driving the synchronous motor 128 with disk 125' and synchronous motor 132 with disk 134.

Figure 11A:
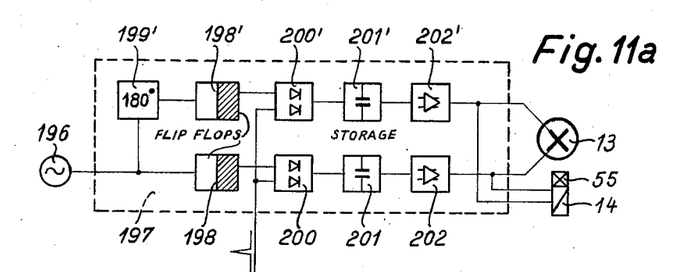

In the switch unit 197, shown in greater detail in FIGURE 11a, the alternating current obtained from the mains 196 is supplied to a bistable multivibrator 198, and via a phase-shifter 199', shifting the phase by 188°, to a parallel-connected multivibrator 198'. From the two multivibrators two rectangular voltages, shifted by 90°, and having half the mains frequency, are obtained which are then supplied to phase-sensitive switches 200 and 200'. The pulses from photoelectric receiver 129' are passed through the pulse-forming stage 130 and then control switches 200 and 200'. The actual values of the phase-shifted rectangular voltages are then supplied to two storages 201 and 201'. The voltage obtained from these storages form a two-phase rotary field, a four-cycle being equivalent to the displacement of the scale 1a by one interval of the division strokes. The currents of the semi-connected direct current amplifiers 202, 202' actuate motor 13 and the slow-operation relay 14.

Figure 11B:
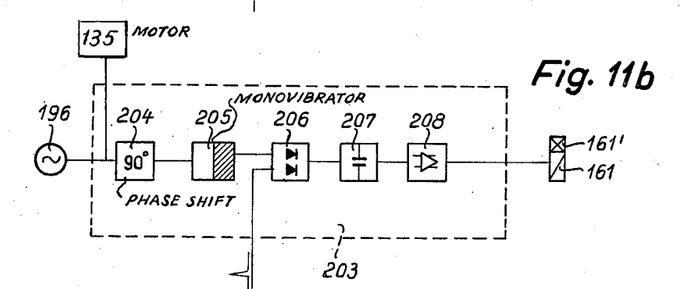

The direction of correction is determined by the switch unit 203, illustrated in FIGURE 11b. The voltage of the alternating current mains 196 is supplied to a phase shifter 204, shifting the phase by 90°, and is then supplied to a monostable multivibrator 205 which is so devised that it returns to its stationary condition after ⅓ of a full revolution of indicating disk 134. The obtained rectangular voltage is supplied to a phase-sensitive switch 206 which is also controlled by the pulses of the photoelectric receiver 129' and is then fed to the storage 207. The actual voltage stored therein passes over direct current amplifier 208 and operates the slow-operation relay 161 which, in turn, actuates switch 147'.

In the embodiment of FIGURE 11, the indicating unit contains only one stroboscopic lamp 140'. It is ignited by a photoelectric receiver 129' via thyratron 131 and igniter 143'. Furthermore, there is provided a diaphragm 209 disposed before counter 21 and indicating disk 134 and having windows 210, 211 and 212. It can be displaced by the T-shaped core 48 cooperating with coils 49 and 50 by one numeral of counter 21 and the sets of numbers 135 and 136. A screen 213, having windows 214, 215 is provided before diaphragm 209. The window 214 is so constructed that in case of an equivocal position both numerals of unit roll 22 are visible, as well as one numeral of each of rolls 23 and 24. Through window 215 numerals of the sets of numerals 135 and 136 on indicating disk 134 can be observed. The window 210 has a height of about ⅔ of the height of a single numeral and is disposed behind screen window 214. The diaphragm windows 211 and 212 are spaced from each other by the height of one numeral and through these windows numerals of one or the other of the two sets 135 and 136, according to the respective position of diaphragm 209, can be viewed through screen window 215.

The correction is effected in a manner analogous to the operation described with respect to the previous embodiments, with the exception that one of the two sets of numerals 135 and 136 is removed from observation by displacing diaphragm 209 instead of by means of alternating ignition of two stroboscopic lamps.

Figure 12:
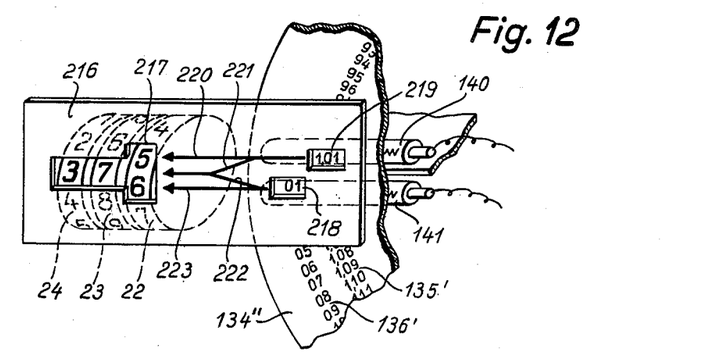
FIGURE 12 illustrates another embodiment of the apparatus of the invention enabling reading of the correct measured value without special correction means.

FIGURE 12 illustrates an embodiment wherein the corrected value is indicated without mechanical auxiliary means. Contrary to the sets of numerals 135 and 136 the scales 135' and 136' are displaced relative to one another by one numeral and have associated two stroboscopic lamps 140 and 141 which have already been described previously. A screen 216 is disposed in front of indicating disk 134" and counter 121. The screen has windows 217, 218, 219 as well as arrow marks 220, 221, 222, 223. Through window 217 numerals of rolls 22, 23, 24 can be observed as described with respect to the embodiment of FIGURE 11. Through windows 218, 219 a section of scales 136' and 135' can be observed, respectively.

The arrow marks facilitate a correct reading of the measured values, which will be appreciated with reference to the following example: If, for example, a stroboscopic lamp 140, disposed behind window 219, emits a light flash, the value behind window 219, for example 1.01, is indicated. With the aid of arrow 220 numeral 5 on unit roll 22 of counter 21 can be coordinated with a fine-measured value, other numerals on the counter being, for example 7 on the ten roll and 3 on the hundred roll. Accordingly, the correct measured value is 375+1.01=376.01. If, however, stroboscopic lamp 141 flashes, with the change from lamp 140 to lamp 141 being effected somewhere between the values 01 and 30, then the arrow 223 directly indicates the measured value 376.01.

If one numeral on unit roll 22 is in unequivocal alignment with the numerals on the other rolls, the value is indicated by arrows 221 or 222, respectively.

It will be noted that instead of the disks having a spiral-shaped opening used in the afore-described embodiments of the invention, a drum having such a spiral-shaped opening or any other element producing relaxation oscillation can be used.

Furthermore, the step-by-step motor 13 can be replaced by a step-switch mechanism and the slow-operation relay 14 with the retarding unit 55 can be replaced by an electric relay.

In particular it will be noted that the embodiments illustrated and described in the foregoing specification are to be considered as primarily illustrative and not as limiting the modification scope or the applicability of the basic principles of the invention.

It will also be understood that this invention is susceptible to modification in order to adapt it to different usages and conditions and, accordingly, it is desired to comprehend such modifications within this invention as may fall within the scope of the appended claims.

What we claim is:

1. Apparatus for indicating numerical values of unmarked scales having division strokes, comprising: a scanning means responsive to the passage of division strokes and including a photoelectric detector responsive to the relative position of a division stroke with respect thereto; circuit means connected for deriving four signals fom said scanning means upon passage of a complete interval between two strokes, a step-by-step motor connected to and controlled by said circuit means; a counter including a unit roll drivingly connected to said motor with at least two steps from one unit to another, with each unit representing the passage of a stroke, said counter indicating the number of strokes passed; a unit fraction indicator connected to said photoelectric detector; means responsive to the position of said unit fraction indicator; and electrically controlled correcting means connected to said position responsive means and said circuit means for associating the correct unit from said unit roll to the respectively indicated fraction whenever said unit roll has an ambiguous position due to its moving from unit to unit in two steps.

2. Apparatus for indicating numerical values of unmarked scales having division strokes, comprising: a scanning means responsive to the passage of division strokes and including a photoelectric detector responsive to the relative position of a division stroke with respect thereto; electric circuit means connected for deriving four signals from said scanning means upon passage of a complete interval between two strokes; a step-by-step motor connected to and controlled by said electric circuit means; a counter including a unit roll drivingly connected to said motor and driven with at least two steps from one unit to another and each unit representing one stroke, said counter indicating the number of strokes passed; a manually rotatable unit fraction indicator operatively linked to said photoelectric detector; a disc drivingly connected to said unit fraction indicator; electric switching means phase responsive to the angular position of said disc; and electrically controlled correcting means connected to and controlled by said switching means and said circuit means for associating the correct unit from said unit roll to the respectively indicated fraction whenever said unit fraction indicator indicates the first and the last quarter of a scale division stroke interval.

3. Apparatus for indicating numerical values of unmarked scales having division strokes, comprising: a scanning means responsive to the passage of division strokes and including a photoelectric detector responsive to the relative position of a stroke with respect thereto; electric circuit means connected for deriving four signals from said scanning means upon passage of a complete interval between two strokes; a step-by-step motor connected to and controlled by said electric circuit means; a rotatable counter including a pluraltiy of rolls including a unit roll drivingly connected to said motor and moved from unit to unit in two steps per stroke; indicator means positioned adjacent said unit roll for indicating the counted unit value; an electromagnet having armature means coupled to shift the relative position between said indicator means and said unit roll corresponding to one step; a unit fraction indicator connected to said photoelectric detector; electric control means interconnecting said electromagnet, said unit fraction indicator and said circuit means, for energizing said electromagnet so as to shift said relative position in one of two opposite directions whenever said unit fraction indicator respectively indicates the first and the last quarter of a scale stroke interval.

4. Apparatus for indicating numerical values of unmarked scales having division strokes, comprising: a scanning means responsive to the passage of division strokes and including a photoelectric detector including a light sensitive element responsive to the relative position of a division stroke with respect thereto; electric circuit means connected for deriving four signals per passing stroke and interval between two strokes from said scanning means; a step-by-step motor connected to and controlled by said electric circuit means; a counter including a unit roll drivingly connected to said motor and driven by said motor with at least two steps from one unit to another and indicating the number of strokes passed with each unit representing one stroke; said photoelectric detector including a rotatable disc having a spiral gap and being interposed between said scale and said light sensitive element pertaining to said detector, said gap permitting sensitization of said element at a particular phase position of said disc with respect to a stroke; electric means sensing said phase position; a stroboscoping lamp connected to and controlled by said electric means so as to produce a train of light flashes indicative of said phase position; a rotatable unit fraction indicator means in the light path of said light flashes; means for driving said disc and said indicator means at a fixed phase relationship; and electrically controlled correcting means responsive to said phase position and connected to said circuit means for associating the correct unit from said unit roll to the respectively indicated fraction whenever said unit roll has an ambiguous position due to its moving from unit to unit in two steps.

5. Apparatus for indicating numerical values of unmarked scales having division strokes, comprising: a first photoelectric detector circuit responsive to the passage of division strokes and producing signals for one passing stroke which signals are in phase quadrature one to the other; a step motor connected to said first detector and driven in response to said signals; a counter including a unit roll drivingly connected to said motor and driven in two steps from unit to unit with each unit corresponding to one stroke; a second photoelectric detector responsive to the position of a division stroke; manual adjustment means for zeroing said second detector to the stroke under observation; a unit fraction indicator connected to said adjustment means; a cam disc drivingly connected to said adjustment means; a phase sensitive switch operated by said cam disc and having two operating positions respectively assumed when said fraction indicator indicates first and last quarter of a division stroke interval; a relay connected to said first detection circuit and assuming open and closed position depending upon the position of said unit roll; an indicator means positioned adjacent said unit roll for indicating a counted unit value; control means for shifting the relative position between said unit roll and said indicator means; and a circuit network connected to said control means for activation thereof, and responsive to said operating positions of said phase sensitive switch and of said relay for determining said relative position.

6. Apparatus for indicating numerical values of unmarked scales having division strokes, comprising: a photoelectric detector including optical means reproducing said scale and including light sensing means responsive to the images of said division strokes; a rotatable disc having a spiral gap and being interposed between said light sensing means of said detector and said reproduced scale, said detector producing a signal when a portion of said gap is aligned with a stroke image of said reproduced scale; first circuit means connected to said detector and producing an electric signal in response to said detector signal; a rotating element phase-locked with said disc; four scanning elements positioned adjacent said rotating element and being energized in pairs upon occurrence of said electric signal; a circuit network responsive to the energization of said scanning elements and producing an alternating output when said signal shifts in phase with respect to said rotating element; a step motor connected to said network and driven in response to said alternating output; a counter including a unit roll drivingly connected to said motor and changing per stroke from unit to unit in two steps; a rotating unit fraction indicator disc phase-locked with said rotatable disc; a stroboscopic lamp arrangement flashing light pulses towards said indicator disc upon occurrence of said signal; a phase sensitive switch connected to said detector and producing phase-sensitive signals respectively distinguishing between first and last quarter of a unit interval; a relay connected to said network responsive to said alternating output; an indicator means positioned adjacent said unit roll for indicating the counted unit value; control means for changing the relative position between said unit roll and said indicator means; and a second electric circuit network connected to said control means and responsive to said phase sensitive switch and said relay response for determining said relative position.

7. A digital scale reading device for a scale having division strokes and an associated scanning pattern consisting of a plurality of frames with two division strokes corresponding to one frame, comprising: first photoelectric detector means scanning said pattern; a motor electrically connected to said first detector and activated when said pattern passes thereunder; a counter having a unit roll drivingly connected to said motor and being shifted in two steps per stroke; indicator means positioned adjacent said unit roll for indicating the counted unit value; an electromagnet having armature means coupled to shift the relative position between said indicator means and said unit roll; a second photoelectric detector means responsive to the relative position of a division stroke; a scale unit fraction indicator connected to said second detector means; and phase responsive correcting means electrically connected to said first detector means and operatively connected to said fraction indicator so as to shift said relative position whenever said unit fraction indicator indicates any of the first and last quarter of a scale stroke interval.

8. Apparatus for indicating numerical values of unmarked scales having division strokes, comprising: a photoelectric detector responsive to said division strokes; first circuit means for deriving an alternating signal from said detector upon passage of strokes; second circuit means for deriving a signal from said detector indicative of the position of a particular stroke; a step motor connected to said first circuit means and driven in steps by said alternating signal; a counter including a unit roll drivingly connected to said step motor and driven from unit to unit by two steps per division stroke; unit fraction indicating means connected to and responsive to the output of said second circuit means; and a correcting element connected to said first and said second circuit means and being phase responsive to first and last quarter of a division stroke interval indicated by said fraction indicating means so as to associate one unit value to the indicated fraction whenever said unit roll has an ambiguous position due to its two step motion between units.

9. Apparatus for indicating numerical values of unmarked scales having division strokes, comprising: a scanning means responsive to the passage of division strokes and including a photoelectric detector responsive to the relative position of a division stroke with respect thereto; circuit means connected to an A.C. mains for deriving four signals from said scanning means upon passage of a complete interval between two strokes, and in synchronism with the A.C. mains frequency; a step-by-step motor connected to and controlled by said circuit means; a counter including a unit roll drivingly connected to said motor with at least two steps from one unit to another, with each unit representing the passage of a stroke, said counter indicating the number of strokes passed; a unit fraction indicator connected to said photoelectric detector; means for operating said unit fraction indicator in synchronism with said mains frequency; and electrically controlled correcting means connected to said circuit means, said correcting means being energized in phase synchronism with said mains, said correcting means associating the correct unit from said unit roll to the respectively indicated fraction whenever said unit roll has an ambiguous position due to its moving from unit to unit in two steps.

10. Apparatus for indicating numerical values of unmarked scales having division strokes, comprising: a photoelectric detector responsive to the passage of division strokes and including a light sensitive element responsive to the relative position of a division stroke with respect thereto; a rotatable disc having a spiral gap and being interposed betwen said scale and said light sensitive element pertaining to said detector, said gap permitting sensitization of said element at a particular phase position of said disc with respect to a stroke; electric circuit means connected to said detector for driving four signals per passing stroke and interval between two strokes; a step-by-step motor connected to and controlled by said electric circuit means; a counter including a unit roll drivingly connected to said motor and driven by said motor with at least two steps from one unit to another and indicating the number of strokes passed with each unit representing one stroke; a rotatable unit fraction indicator means having two concentric scales and rotating in phase locked relation with said disc; means for driving said disc and said indicator means at a fixed phase relationship; two stroboscopic lamps individually connected to and controlled by said scanning means so as to produce mutually excluding trains of light flashes indicative of said phase position; and electrically controlled correcting means responsive to said phase position and connected to said circuit means for associating the correct unit from said unit roll to the respectively indicated fraction whenever said unit roll has an ambiguous position due to its moving from unit to unit in two steps.

References Cited in the file of this patent
UNITED STATES PATENTS 2,948,890  Barth ------------------ Aug. 9, 1960